3,271,242
STABLE CHLORINE DIOXIDE COMPOSITION AND METHOD OF MAKING SAME

Thomas P. McNicholas, Johnston, R.I., assignor to Alexander R. Reed III, Agawam, Mass., Leon R. Noel, North Adams, Mass., and Alexander C. Politis, Pittsfield, Mass.

No Drawing. Filed Mar. 29, 1963, Ser. No. 269,171
9 Claims. (Cl. 167—17)

This invention relates to chlorine dioxide compositions, and pertains more particularly to methods of improving the stability of antiseptic and bleaching compositions in which chlorine dioxide is retained in an aqueous solution by combination with peroxy compound, as illustrated for example in Patent No. 2,701,781 to Guevara or in my co-pending application Serial No. 327,500, filed December 2, 1963, for Stabilized Chlorine Dioxide Solution.

In the compositions of the type to which this invention pertains, the chlorine dioxide, which is the active agent, is retained in the solution as a labile complex, when the solution is alkaline, and is released when the solution becomes acid. For antiseptic use, the pH of the solution preferably is neutral or slightly alkaline. When a slightly acid environment, such as that associated with the presence of bacteria, is encountered, the chlorine dioxide molecule is released, producing the antiseptic action. For use as a bleach, acid may be added to the solution at the time of use to promote rapid release of the chlorine dioxide. It has been found that these solutions deteriorate fairly rapidly when stored, losing most of their chlorine dioxide content in eight or ten weeks. The solutions can be stabilized by adding alkaline chemicals. In general, the more the pH is raised, the more stable the solution becomes. However, the addition of alkaline chemicals impairs or destroys the effectiveness of the solutions as antiseptics because the acid condition normally associated with bacteria will not lower the pH sufficiently to release the chlorine dioxide molecule. For effective antiseptic action the pH of the solution should be in the range between 6.8 and 7.2.

The principal object of this invention is to provide a method of stabilizing chlorine dioxide compositions without use of chemcal additives so that they will retain their chlorine dioxide content for long periods of time, while keeping the pH of the compositions within the range required for its various uses. Another object is to provide a method of reducing such compositions to powder form. Still another object is to provide a method of combining such compositions for antiseptic use with a quick acting bacteriocide such as iodine. Other objects, advantages, and novel features will be apparent from the following description.

The process here described consists essentially of heating a chlorine dioxide solution of the type to which the invention pertains while maintaining continuous agitation of the solution. Temperatures much below 70° C. are ineffective and the temperature should not exceed 92° C. because at higher temperatures the chlorine dioxide will be driven off. The solutions may be heated in vacuum within an equivalent temperature range, depending on the degree of vacuum. The heating and agitation must be carried on for a long enough period to be effective. Optimum results are obtained by raising the temperature of the solution from room temperature to 92° C. at atmospheric pressure or the equivalent at lower pressure, over a period of 45 to 60 minutes.

The nature of the reaction is not entirely understood, but it is believed that the loss of chlorine dioxide, in the unstabilized solutions, is due to the presence of free hydrogen peroxide which acts as a leaching agent to release the chlorine dioxide. By heating the solution within the temperature range indicated above for a long enough time all the free peroxides can be driven off. It can be determined by test with potassium starch iodide whether stabilization has been completed. The test will show a purple color if free peroxides are still present.

Generally, the heating and agitation should be continued until no color shows in the potassium starch iodide test. It is not desirable, however, to maintain the solutio at 92° C. for long because the stabilizing bond of the chlorine dioxide may be broken allowing the gas to escape. This reduces the concentration of the composition and will also obscure the potassium starch iodide test, as the escape of chlorine dioxide will also color the test material. If a test indicates that a batch of solution is not completely stabilized when its temperature reaches 92° C., the solution should be cooled to about 75° C. and again reheated with continuous agitation. This process can be repeated until tests indicate that stabilization is complete.

The following are examples of specific applications of the process.

Example I

Chlorine dioxide gas is first generated in any well-known manner and bubbled into a water solution of a peroxy compound until the pH reaches about 7. The solution may be that illustrated in Example II of the Guevara patent containing 8% sodium perborate. Solutions such as those described in my copending application Serial No. 327,500, filed December 12, 1963, employing concentrations varying from 40 p.p.m. to 50,000 of a peroxy compound such as potassium persulfate, sodium carbonate peroxide, magnesium peroxide, calcium peroxide, sodium pyrophosphate peroxide, urea peroxide, or other hydrogen peroxide compound, may also be stabilized in the manner about to be described.

A batch of the solution is placed in a vessel equipped with means for agitating the solution and controllable heating means. The temperature of the solution is gradually raised, while maintaining continuous agitation until at the end of a 45 minute period the temperature reaches 92° C. If the potassium starch iodide test indicates no free peroxide content, stabilization is completed. If the test indicates residual free peroxide, the solution is allowed to cool to about 75° C. and then reheated to 92° C.

A chlorine dioxide peroxy solution stabilized in this manner retains substantially its original chlorine dioxide content, which may be as high as 10% if, for example, sodium carbonate peroxide is used as the peroxy compound. The pH remains in the desired range for antiseptic purposes, 6.8 to 7.2. Samples of the stabilized solution can be stored under average ambient temperature conditions for a number of years without appreciable loss of chlorine dioxide content.

Example II

Chlorine dioxide is generated into a solution of water and a peroxy compound. In order to shorten the drying time it is desirable to use as concentrated a solution as possible, depending on the solubility of the particular peroxy compound. The solution is stabilized as described in Example I. The solution is then dried at a temperature of about 75°–80° C., in atmosphere or the equivalent in vacuum.

The powder is easier to package and ship than the liquid. The powder can be mixed with water to form a solution of the desired concentration. The powder may also be made into tablets by mixing with a non-reactive binder, and a bulk additive, such as salt, may be added, if necessary, to make tablets of a practical size.

Example III

One of the peroxy compounds previously referred to, such as sodium carbonate, is dissolved in water. The solution may be of any desired concentration up to the saturation point for the particular compound. Potassium iodide is added in a proportion of about 3½ parts to 5 parts of the chlorine dioxide which is to be added. Chlorine dioxide is generated into the solution, which first turns red, then brown, and finally becomes clear or faintly yellow. The solution becomes clear, when the desired chlorine dioxide content is reached. The solution is then stabilized by the process deescribed in Example I, and may be dried to powder form as described in Example II. When this material is used for antiseptic purpose, iodine is released first, on contact with an acid environment. The chlorine dioxide will be released afterward for continuing antiseptic action. This composition is intended only for antiseptic use.

The liquid forms of the stabilized compositions are diluted with water, and the powder forms are reconstituted to solutions of the desired strength for the intended use. The following are some representative concentrations recommended for various uses.

| | P.p.m. |
|---|---|
| Sanitizing wash: | |
|    Dairy vessels | 40–80 |
|    Operating room walls | 500–1000 |
|    Laundry use | 300–500 |
| General antiseptic | |
|    Cuts and burns | 2500 |
|    Mouth wash | 1250 |
|    Deodorizer and deodorant | 500 |
| Bleach | 500–1000 |

When the compositions are used primarily for bleaching purposes, it is desirable to add a mineral acid, such as hydrochloric or oxalic acid, at the time of use in sufficient quantity to lower the pH to 2, for fast bleaching action.

One advantage derived from the stabilizing process is that the shelf life of the concentrated compositions is markedly prolonged. Another advantage is that the concentration of a solution diluted or reconstituted for use from material which has been stored is a known quantity, whereas the loss of strength of unstabilized compositions over even a few weeks is a variable factor. The user of the stabilized compositions is assured that the mixed material will be of the proper strength for the intended use.

The action of this type of composition, when used as an antiseptic, is a continuing one. In the presence of acid the chlorine dioxide is released until the bacteria which are the source of a condition have been killed. The material then becomes inactive retaining chlorine dioxide which will again be released if a new source of contamination is introduced. A film of the antiseptic left to dry on an article will thus afford antiseptic protection for a considerable period after application of the material. The stabilization of the material improves its chlorine dioxide retention and thus prolongs its continuing antiseptic action.

The temperature range in which the stabilizing process is carried out in atmosphere is between 70° C. and 92°C. It is understood that this range, as referred to in the claims includes the equivalent range with respect to the boiling point of water at pressures lower or higher than standard atmospheric pressure.

What is claimed is:

1. The method of making a stable chlorine dioxide composition which comprises, heating an aqueous soluton of chlorine dioxide and a hydrogen peroxide compound to a temperature range sufficiently high to drive off any free peroxide in the solution but too low to drive off the chlorine dioxide, and maintaining the solution at a temperature within said range until substantially all the free peroxide is driven off.

2. The method described in claim 1, the solution being continuously agitated while heated and maintained in said temperature range.

3. The method of making a stable chlorine dioxide composition which comprises, heating an aqueous solution of chlorine dioxide and a hydrogen peroxide compound to a temperature in the range 70° C. to 92° C., and maintaining the solution at a temperature within said range until substantially all the free peroxide is driven off.

4. The method of making a stable chlorine dioxide composition which comprises, heating an aqueous solution of chlorine dioxide and a hydrogen peroxide compound to a temperature in the range 70° C. to 92° C., and maintaining the solution at a temperature within said range for a period of 45 to 60 minutes.

5. The method as described in claim 4, the solution being continuously agitated while heated and maintained in said range.

6. The method as described in claim 4, which includes the further step of drying the solution to powder form at a temperature below 92° C.

7. The method of making a stable chlorine dioxide composition which comprises heating an aqueous solution of chlorine dioxide and a hydrogen peroxide compound to a temperature not exceeding 92° C., cooling the solution, reheating the solution to a temperature not exceeding 92° C., and continuing to so cool and reheat the solution until substantially all free peroxide has been driven off.

8. The method of making a stable chlorine dioxide antiseptic composition which comprises adding chlorine dioxide to an aqueous solution of a hydrogen peroxide compound and an iodine compound, and subsequently heating the solution to a temperature not exceeding 92° C. until substantially all free peroxide has been driven off.

9. A stable chlorine dioxide composition made by the method described in claim 1.

References Cited by the Examiner

UNITED STATES PATENTS

| 2,833,624 | 5/1958 | Sprauer | 23—152 |
| 2,918,400 | 12/1959 | Loonam | 167—17 |

JULIAN S. LEVITT, *Primary Examiner.*

G. A. MENTIS, *Assistant Examiner.*